(12) United States Patent
Tahmouresinia

(10) Patent No.: US 10,808,175 B2
(45) Date of Patent: Oct. 20, 2020

(54) FLAME OR FIRE PROTECTION AGENT AND PRODUCTION AND USE THEREOF, IN PARTICULAR FOR WOOD-, CELLULOSE- AND POLYOLEFIN-BASED PRODUCTS

(71) Applicant: Fernando Tahmouresinia, Hildesheim (DE)

(72) Inventor: Fernando Tahmouresinia, Hildesheim (DE)

(*) Notice: Subject to any disclaimer, the term of this patent is extended or adjusted under 35 U.S.C. 154(b) by 0 days.

(21) Appl. No.: 16/068,640

(22) PCT Filed: Jan. 9, 2017

(86) PCT No.: PCT/EP2017/050361
§ 371 (c)(1),
(2) Date: Jul. 6, 2018

(87) PCT Pub. No.: WO2017/118765
PCT Pub. Date: Jul. 13, 2017

(65) Prior Publication Data
US 2019/0016958 A1     Jan. 17, 2019

(30) Foreign Application Priority Data
Jan. 9, 2016    (DE) ........................ 10 2016 100 271

(51) Int. Cl.
    *C09K 21/02*        (2006.01)
    *C01B 32/20*        (2017.01)
    *D21H 17/65*       (2006.01)
    *C08K 3/16*         (2006.01)
    *D06M 11/82*      (2006.01)
    *D21H 21/34*       (2006.01)
    *H01B 7/295*       (2006.01)
    *D06M 11/13*      (2006.01)
    *D06M 11/74*      (2006.01)
    *D06M 13/432*     (2006.01)
    *B27K 3/16*         (2006.01)
    *C09K 21/10*       (2006.01)
    *B27K 3/52*         (2006.01)
    *C08K 3/04*         (2006.01)
    *C08K 3/38*         (2006.01)
    *D21H 17/66*       (2006.01)
    *D21H 17/67*       (2006.01)
    *D21J 1/08*         (2006.01)
    *D21J 3/00*         (2006.01)
    *E04B 1/94*         (2006.01)

(52) U.S. Cl.
CPC .............. *C09K 21/02* (2013.01); *B27K 3/163* (2013.01); *B27K 3/52* (2013.01); *C01B 32/20* (2017.08); *C08K 3/04* (2013.01); *C08K 3/16* (2013.01); *C08K 3/38* (2013.01); *C09K 21/10* (2013.01); *D06M 11/13* (2013.01); *D06M 11/74* (2013.01); *D06M 11/82* (2013.01); *D06M 13/432* (2013.01); *D21H 17/65* (2013.01); *D21H 17/66* (2013.01); *D21H 17/67* (2013.01); *D21H 21/34* (2013.01); *D21J 1/08* (2013.01); *D21J 3/00* (2013.01); *E04B 1/941* (2013.01); *H01B 7/295* (2013.01); *B27K 2240/30* (2013.01); *C08K 2003/387* (2013.01); *D06M 2200/30* (2013.01)

(58) Field of Classification Search
None
See application file for complete search history.

(56) References Cited

U.S. PATENT DOCUMENTS

| 4,065,413 | A | * | 12/1977 | MacInnis | ................ C08L 97/02 524/14 |
|---|---|---|---|---|---|
| 4,514,326 | A | * | 4/1985 | Sallay | ................ C01B 35/1063 106/15.05 |
| 5,247,005 | A | | 9/1993 | von Bonin et al. | |
| 5,288,429 | A | | 2/1994 | von Bonin et al. | |
| 5,443,894 | A | | 8/1995 | Pollock et al. | |
| 6,444,714 | B1 | | 9/2002 | Gluck et al. | |
| 2002/0011593 | A1 | * | 1/2002 | Richards | ................ C09K 21/02 252/601 |
| 2015/0203731 | A1 | | 7/2015 | Herrlich et al. | |
| 2015/0368560 | A1 | * | 12/2015 | Pascal | ................... D21H 21/36 106/18.12 |
| 2018/0327670 | A1 | * | 11/2018 | Tahmouresinia | ...... C09K 21/02 |

FOREIGN PATENT DOCUMENTS

| AT | 507049 A1 | 1/2010 |
|---|---|---|
| DE | 4007060 A1 | 9/1991 |
| DE | 4117074 A1 | 11/1992 |
| DE | 4117077 A1 | 11/1992 |

(Continued)

*Primary Examiner* — Joseph D Anthony
(74) *Attorney, Agent, or Firm* — Mayer Brown LLP

(57) ABSTRACT

The invention relates to the use of expanded graphite for reducing flammability and/or combustibility, in particular the use thereof as a flame protection agent and/or a fire protection agent, for materials and/or products which consist of or comprise wood fibers, cellulose fibers, wood powder, cellulose powder, wood granulates, cellulose granulates, and/or polyolefin-based materials. The invention further relates to materials and/or products which consist of or comprise wood fibers, cellulose fibers, wood powder, cellulose powder, wood granulates, cellulose granulates and/or polyolefin-based materials. In order to reduce the flammability and/or combustibility, expanded graphite is embedded into the materials and/or products, in particular in the form of a flame protection agent and/or a fire protection agent. The invention also relates to such an agent, in particular a flame protection agent and/or a fire protection agent, wherein expanded graphite is used alone or in combination with a boric acid/borax/alkali salt mixture. A particularly preferred area of use is binders, glues, and/or materials, products, and/or pre-products containing polyolefin-based materials in particular, preferably for damping (walls, floors, ceilings) and/or for floor and wall fittings. The invention is characterized by surprising advantages in fire protection tests with vertical edge flaming.

19 Claims, No Drawings

(56) References Cited

FOREIGN PATENT DOCUMENTS

| | | | |
|---|---|---|---|
| DE | 69617506 | T2 | 5/2002 |
| EP | 0735187 | B1 | 12/2001 |
| EP | 2208594 | A1 | 7/2010 |
| WO | 00/34342 | A2 | 6/2000 |
| WO | 2014026741 | A1 | 2/2014 |

* cited by examiner

FLAME OR FIRE PROTECTION AGENT AND PRODUCTION AND USE THEREOF, IN PARTICULAR FOR WOOD-, CELLULOSE- AND POLYOLEFIN-BASED PRODUCTS

This application is a national stage entry of International Application No. PCT/EP2017/050361, filed on Jan. 9, 2017, which claims benefit of DE Patent Application No. 10 2016 100 271.2 filed on Jan. 9, 2016; which are incorporated herein by reference in their entirety to the full extent permitted by law.

The invention relates to an agent, in particular a flame retarding agent and/or a fire retarding agent, for reducing the flammability and/or combustibility of various materials or matters, such as, for example, wood and wood products, textiles and textile products, paper and paper products, cardboard, fibers and fabrics, paints, etc., or based on or in combination with polyolefin-based materials and/or products and/or pre-products, including composites and/or composite materials therewith, the manufacture of the agent and methods and processes, respectively, using the agent and/or the corresponding combination of its individual constituents for reducing of flammability and/or combustibility.

Fire and its discovery is one of the most important events in the history of mankind, with enormous impact on human development. In addition to its function, which is essential for human life, the fire also has a disadvantage, namely, its burning property, which leads to numerous material and financial damages in our society.

Easily flammable materials and matters are dangerous, as they are prone to catch fire and ignite fires. Therefore, it is important to find an effective way to provide such flammable matters with flame and/or fire protection, which make such materials and matters less dangerous.

The invention relates to an agent for reducing the flammability and/or combustibility of materials, in particular to flame retarding agents and/or fire retarding agents.

Known flame retardants are mixtures of organic and/or inorganic substances which are intended to prevent or at least to inhibit a taking fire or merely an igniting of wood or wood-like materials, plastics, textiles, paper, cardboard, carton, artificial and natural fibers as well as fabrics, paints, or products thereof, building materials, insulation materials, electrical and/or cable insulation, etc. In addition, they are intended in particular to make the combustion of these materials more difficult.

Indeed many substances or groups of substances are known in the art as such which have a flammability inhibiting effect. However, the circumstance that, as a rule, efforts were made to use compound mixtures and not individual compounds or substances for these purposes, it can already be seen that the properties and effects of these compounds or substances as such have been considered not yet being optimal for the chosen purpose. The concrete making-up under adaptation to all the boundary conditions of the individual case, in particular taking into account possibly undesired side effects, also takes place from the point of view of environmental compatibility. A further criterion is the complexity of the respective production process.

In the field of wood- and/or cellulose-based products and/or polyolefin-based materials and/or products and/or pre-products, flame protection and/or fire protection has still not been satisfactorily solved in practice despite numerous proposals in the state of the art. Particularly in the case of products that are made of fibrous wood and/or cellulose materials, e.g. by foaming, felting, compacting and/or pressure grouting/compression, or based on or in combination with polyolefin-based materials and/or products and/or pre-products, the flame protection and/or fire protection is still unsatisfactory, since unfortunately also wood and/or cellulose materials which, after treatment with inorganic flame protection and/or fire protection, as such are not inflammable per se and also do not show afterglow in the flame protection and/or fire protection test, despite improved flame protection or fire protection behavior, after further processing with further substances such as e.g. glues or adhesives to foamed, felted, compacted or pressure-grouted/pressed products unexpectedly do afterglow, at the worst even to the point of decomposition of the mentioned wood and/or cellulose products. This unexpected afterglow has been observed even in the application of novel optimized inorganic flame retardants and/or fire retardants, as described in German patent application DE 10 2015 119 558.5 dated Nov. 12, 2015 (with priority of Jun. 16, 2015), the disclosure of which is hereby incorporated by reference as part of the present patent application as fully incorporated. In addition, the fire protection and/or flame protection of binders and/or glues-containing as well as polyolefin-based materials and/or products and/or pre-products on the one hand for insulation and on the other hand for floor coverings and wall coverings, both indoors and outdoors, is still not yet satisfactorily solved in practice, despite of various proposals in the prior art.

Against this background, it is the object of the invention to provide an agent of the kind described at the outset which does not damage the material and/or product and/or pre-product to be protected, and in particular, does not release any toxic gases. Moreover, the manufacture of the agents and their use, in particular of binders and/or glues-containing as well as polyolefin-based materials and/or products and/or pre-products on the one hand for insulation and on the other hand for floor coverings and wall coverings, both indoors and outdoors, should be simple and economical very beneficial. This object is achieved with such a use and such an agent having the features indicated in the claims.

Accordingly, the invention broadly relates to the use of expandable graphite for reducing flammability and/or combustibility, in particular the use as flame retarding agents and/or fire retarding agents, for materials and/or products and/or pre-products consisting of or comprising wood fibers and/or cellulose fibers and/or wood powders and/or cellulose powders and/or wood granules and/or cellulose granules and/or polyolefin-based materials, in particular for materials and/or products and/or pre-products containing binders and/or glues and/or polyolefin-based materials, preferably for insulation (wall, floor, ceiling) and/or for floor coverings and wall coverings. Such materials and/or products and/or pre-products for the insulation can be provided according to the invention equally for the interior and exterior area. Such materials and/or products and/or pre-products, floor coverings and wall coverings, according to the invention, can also be provided for the interior and exterior areas, but the interior area is preferred in the context of the present invention.

By definition, materials comprising polyolefin-based materials and/or products and/or pre-products are those which comprise or consist of (heteroatom-free) aliphatic and/or (heteroatom-free) aromatic polyolefins. The polyolefins mentioned can be used here as powder, granules and/or polymer solution, or it can be provided for processing or application technology the melting on, foaming on and/or pressing. Preferred aliphatic polyolefins here are in particular polyethylene and/or polypropylene. The preferred aromatic polyolefin in particular here is polystyrene. Polystryol may be a polystyrene-based thermo-plastic foam, preferably an expanded or extruded polystyrene-based thermoplastic foam. Optionally, the invention is characterized in that the foamed polystyrene is a thermo-plastic foam based on polystyrene as expanded (EPS) and/or extruded polystyrene (XPS).

If the invention is described below using the example of wood fibers and/or cellulose fibers, and of materials and/or (pre)products made therefrom or comprising them, the person skilled in the art will recognize that this disclosure equally applies also to wood powder and/or cellulose powder and/or wood granules and/or cellulose granules, and materials and/or (pre-)products made therefrom or comprising them.

Binders and glues are the substances commonly used in wood processing and known to the person skilled in the art. Binders and glues will be discussed in more detail below.

In this context, the term "fiber" is to be understood according to the invention: A fiber, in relation to its length, is a thin and flexible structure, which is made from a fibrous material. In order to speak of a fiber in the technical field, the ratio of length to diameter should be at least between 3:1 and 10:1; for many, e.g. textile, applications it is more than 1000:1. In the longitudinal direction fibers cannot absorb pressure, but only tensile forces, since they buckle under pressure loading.

According to the invention the term "powder" refers to air-dried piles of solid particles. The individual particles differ by size, shape, mass and surface. Coherence is ensured through cohesion forces. The term "fine powder" is used synonymously or more generally as "powder", which is a very fine bulk material, and denotes a very finely ground, dry solid.

In this context, the term "granules" is to be understood according to the invention: granules are clustered aggregates of powder particles which have uneven surfaces and internal structures. The clustering reduces the specific surface area. This leads to a reduction in the adhesion forces, which is more than compensated by mutual staggering and catching of the granulate components during pressure grouting. Granular matter, also called a granular medium or granules, consists of many small, solid particles such as grains or spheres. Examples of this condition are granular materials. Also used are the terms pile for mechanical and bulk material for logistic aspects.

The invention also relates to an expandable graphite-containing agent for reducing the flammability and/or combustibility of materials and/or products and/or pre-products, in particular flame retardants and/or fire retardants, that are particularly suitable for wood and/or cellulose (pre)products and/or polyolefin-based (pre-)products, such as preferably for materials and/or products and/or pre-products consisting of wood fibers and/or cellulose fibers and/or wood powders and/or cellulose powders and/or wood granules and/or cellulose granules and/or polyolefin-based materials, or comprising these, in particular for materials and/or products and/or pre-products containing binders and/or glues as well as polyolefin-based materials for the insulation (wall, floor, ceiling) and/or for floor coverings and wall coverings.

Preference is given to products and/or precursors of wood and/or cellulose fibers containing binders and/or glues and/or polyolefin-based materials of the type described above. These are in particular (insulating) building material products and/or floor coverings and wall coverings, for example in the form of foam-, press-, felt-, nonwoven- and/or composite-(pre-)products, consisting of or comprising wood- and/or cellulose-fibers and binders and/or glues and/or polyolefin-based materials of the type described above. Such products may be fiber press plates or fiber felts or nonwovens, e.g. in the form of mats or wool, powder and/or granular press plates or powder and/or granular foams and/or nonwovens, and these products may preferably be suitable and/or be set up for this purpose or used, for (insulating) construction purposes, for example for indoor and/or outdoor area, in particular for insulation purposes (wall, floor, ceiling), as well as for wall coverings and/or floor coverings.

In one embodiment of the invention, the materials and/or (pre-)products according to the invention are therefore insulation (wall, floor, ceiling), both for the interior and/or exterior area. Preferably, in a further embodiment of the invention these materials and/or (pre-)products according the invention are wall coverings and/or floor coverings for both the interior and/or exterior area, particularly preferably for the interior area.

The invention also relates to materials and/or (pre-) products which consist of, in particular, binder- and/or glues-containing wood fibers and/or cellulose fibers and/or wood powders and/or cellulose powders and/or wood granules and/or cellulose granules comprise, and/or consisting of or comprising polyolefin-based materials of the type described above, wherein into these materials and/or (pre-) products expandable graphite is incorporated, in particular as a flame retardant and/or fire retardant, for reducing flammability and/or combustibility.

The invention also relates to a process for the production of materials and/or products and/or pre-products of the type described above, consisting of and/or comprising wood fibers and/or cellulose fibers and/or wood powders and/or cellulose powders and/or wood granules and/or cellulose granules and/or polyolefin-based materials, and/or consisting of or comprising polyolefin-based materials of the type described above, preferably foam, pressed, felted, nonwoven and/or composite products, wherein during the manufacture of these materials and/or (pre-)products, in particular as materials and/or products and/or pre-products containing binders and/or or glues and/or polyolefin-based materials, preferably for the insulation (wall, floor, ceiling) and/or for floor coverings and wall coverings, in particular as a flame retardant and/or fire retardant, expandable graphite, as defined in claim 8 A), or expandable graphite in combination with a further agent, as defined in claim 8 B), for reducing of the flammability and/or combustibility of materials and/or products, is incorporated for reducing the flammability and/or combustibility.

In a particular process according to the invention (claim 9) for manufacturing materials and/or products of the above type according to the invention, these processes are carried out as follows:

a) in a first process step, wood fibers and/or cellulose fibers and/or wood powder and/or cellulose powder and/or wood granules and/or cellulose granules are treated with the above defined agent for reducing the flammability and/or combustibility of materials, in particular flame retardants and/or fire retardants containing or consisting of a combination and/or a mixture Bs/Bx/S (see the defined in claim 8 B) agent) and then optionally are dried; and b) in a second method step, the wood fibers and/or cellulose fibers and/or wood powder and/or cellulose powder and/or wood granulate and/or cellulose granules treated in process step a) are mixed and/or charged with the combination and/or the mixture Bs/Bx/S as above described (see as defined in claim 8 A)); and c1) if desired, be packaged as bulk goods; and or c2) if desired, be further processed into foamed, pressed, felted, nonwoven and/or composite products.

The above method according to the invention can also be modified, in particular for the embodiments of the invention relating to materials and/or (pre-)products which consist of or comprise wood fibers and/or cellulose fibers and/or wood powders and/or cellulose powders and/or wood granules and/or cellulose granules, containing in particular binders and/or glues, and/or consisting of or comprising polyolefin-based materials of the type described above, wherein expandable graphite, in particular as a flame retardant and/or fire retardant, is incorporated directly into these materials and/or (pre)products for reducing the flammability and/or combustibility. For example, a composition, optionally containing fillers as well as additionally a combination and/or a mixture Bs/Bx/S, containing expandable graphite, can be scattered as a powder and/or granules onto and/or, if present as a solution or emulsion or suspension, also be sprayed onto a treated or untreated foam, press, felt, nonwoven and/or composite-(pre-)product (or carrier formed therefrom), the coating thus obtained melted on, possibly even under surface pressure or areal pressing, and/or dried, for example, at temperatures above about 200° C. For application, extrusion processes for application and/or further processing can also be used. Melting and drying is possible by methods familiar to one of ordinary skill in the art (e.g., hot air, oven, microwave, IR), as well as other common means, e.g. finishing and/or calendaring.

The application of one or more other wear layers and/or decorative layers in conjunction with or in addition to the above method is also possible.

The invention herein expressly also relates to the bulk goods obtained in c1) and the foam, press, felt, nonwoven and/or composite products obtained in c2. Thus, the invention, e.g. as bulk goods, in general also relates to wood fibers and/or cellulose fibers and/or wood powder and/or cellulose powder and/or wood granules and/or cellulose granules and/or consisting of or comprising polyolefin-based materials of the type described above, which are combined with the agent as defined above for reducing the flammability and/or combustibility of insulating materials, wall coverings or floor coverings, in particular flame retardants and/or fire retardants, containing or consisting of a combination and/or a mixture Bs/Bx/S treated and dried, and are mixed and/or tailored with expandable graphite. Likewise, the invention relates to products made therefrom or comprising them, which are further processed into foamed, pressed, felted and/or composite products.

The flame retarding agent and/or fire retarding agent according to the invention can be used in particular outstandingly for the protection of any materials comprising wood, cellulose and/or lignin, fibrous materials and/or (pre-)products comprising them or consisting thereof, and/or (pre-)products consisting of or comprising polyolefin-based materials of the type described above. To be considered, in particular for insulation purposes, wall coverings or floor coverings, applications or products according to the invention, such as for example wood fibers, fibrous wood-containing and/or wood-like materials, and wood fiber products: e.g. doors, windows, parquet, laminate, paneling, ceilings; crates, wooden shelves, furniture; wooden construction material such as rafters, laths, wood fiber fillers for cut-outs or voids, wood fiber product applications for roof trusses or ceiling rests, etc.; for example, wooden parts and/or walls of heat cabins and saunas made from wood- and/or cellulose-fibers, products made from wood- and/or cellulose-fibers, also in connection with textiles and textile products; with paper and paper products, cardboard, cartons, cardboard packaging; products consisting of or comprising fibers and fabrics, artificial and natural fibers, as well as fabrics therewith; composite products of wood and/or cellulose fibers and plastics and plastic products; insulating materials made of wood and/or cellulose fibers and insulating products and/or composite products therewith, including thermal insulation materials and insulation products, electrical and/or cable insulation and such for all types of electrical installations; paints and paint products, etc.; including composites and/or composite materials and/or basic and/or building materials with the above-mentioned materials and/or matters.

However, particularly preferred are insulations, wall coverings, or floor coverings. In this case, the use of expanded graphite according to the invention proves to be particularly advantageous, especially since in case of vertical insulations and vertical wall coverings for flame protection or fire protection assessments it must be edge-flamed, to provide the required fire protection certificates. In this case, the flamed vertically arranged material, i.e. the vertical insulation or the vertical wall covering, neither must melt nor drip in order to pass the required fire protection assessments and fire protection class. This has not been achieved in the prior art, as catastrophic fires of styrene in particular, and also of insulation and wall coverings based on wood and cellulose products, also in the recent past still show. It is known that flames in fires usually spread very easily from bottom to top, i.e. vertically in height. In the event of fire, drops are then produced by fusion of e.g. from the binder and/or glue contained in the wood fibers and/or cellulose fibers and/or from wood powders and/or cellulose powders and/or wood granules and/or cellulose granules, and especially of the polyolefin-based material of the type described above contained in the materials and/or (pre-)products. Hereby, in a vertical arrangement, e.g. of the insulating materials and wall coverings, the melting, dripping binder, glue and/or polyolefin flows all the time from top to down into the edge-flaming, and constantly is feeding the flame formation and the fire.

By the present invention, it is now possible for the first time, in particular by the use of expandable graphite in the above-described materials and/or (pre-)products in the (vertical) edge-flaming, to effectively to effectively prevent a fusing or a drop by fusion of e.g. binder and/or glue contained in the wood fibers and/or cellulose fibers and/or from wood powders and/or cellulose powders and/or wood granules and/or cellulose granules, and especially of the polyolefin-based material of the type described above contained in the materials and/or (pre)products, and thus to prevent the formation of flames and the spread of a fire, but at least to impede a sufficient period of time until extinguishing forces can take on site further firefighting measures.

In the broadest version of the invention, in particular in materials and/or (pre-)products, possibly pretreated with a further flame retardant and/or fire retardant, which consist of or comprise wood fibers and/or cellulose fibers and/or from wood powders and/or cellulose powders and/or wood granules and/or cellulose granules, containing in particular binder and/or glues, the amount of expandable graphite can vary within a wide range of amounts, wherein the amount of expandable graphite in the expandable graphite-containing materials and/or (pre-)products is up to 60 wt.-% based on the material and/or product and/or pre-product used, but preferably is not more than 45 wt.-% based on the total expandable graphite-containing material and/or (Pre-)product as 100 wt.-%. Other amounts and ranges of materials and/or (pre-)products consisting of wood fibers (and/or wood powders and/or wood granules), or comprising these, are described below.

According to the invention, the proportion of expandable graphite in the above-described materials and/or (pre-)products or uses or processes, in particular in embodiments consisting of or comprising polyolefin-based materials of the type described above, is preferably not more than 45 wt.-%, preferably not more than 40 wt.-%, more preferably not more than 35 wt.-%, and most preferably not more than 30 wt.-%, each based on the total material and/or (pre-)product as 100 wt.-%.

According to the invention, the proportion of expandable graphite in the above-described materials and/or (pre-)products or uses or processes is at least 1 wt.-%, preferably at least 2 wt.-%, more preferably at least 3 wt.-%, even further preferably at least 4 wt.-%, and most preferably at least 5 wt.-%, each based on the total material and/or (pre) product as 100 wt.-%.

According to the invention, the proportion of expandable graphite in the above-described materials and/or (pre) products or uses or processes is thus in the range of 1 wt.-% to 45 wt.-%, from 2 wt.-% to 45 wt.-%, from 3 wt.-% to 45 wt.-%, from 4 wt.-% to 45 wt.-%, and from 5 wt.-% to 45 wt.-%. In this case, the proportion of expandable graphite is preferably in the range from 1 wt.-% to 40 wt.-%, from 2 wt.-% to 40 wt.-%, from 3 wt.-% to 40 wt.-%, from 4 wt.-% to 40 wt.-%, and from 5 wt.-% to 40 wt.-%. More preferably, the proportion of expandable graphite here in the range of 1 wt.-% to 35 wt.-%, from 2 wt.-% to 35 wt.-%, from 3 wt.-% to 35 wt.-%, of 4 wt.-% to 35 wt.-%, and from 5 wt.-% to 35 wt.-%. In this case, the proportion of expandable graphite is very particularly preferably in the range from 1 wt.-% to 30 wt.-%, from 2 wt.-% to 30 wt.-%, from 3 wt.-% to 30 wt.-%, from 4 wt.-% to 30 wt.-%, and from 5 wt.-% to 30 wt.-%. All preceding wt.-%-details in each case relate to the total material and/or (pre-)product as 100 wt.-%.

In this case, if desired, the expandable graphite may additionally also take over the function of a (usually inorganic) filler, such as e.g. talc, kaolin or others, and thus replace this filler proportionately. The person skilled in the art can easily determine the respective minimum required amount of expandable graphite to ensure the flame and/or fire protection effect as well as the maximum amount of expandable graphite to maintain the required or desired filler characteristics within the limits given above.

In the patent application DE 10 2015 119 558.5 from Nov. 12, 2015 has been found that with a flame and/or flame retardant, which consists of or contains only boric acid, borax, alkali chloride, preferably sodium chloride, and if desired, urea in the composition given below, the objective for wood and cellulose, especially for wood and/or cellulose fibers as such, is completely achievable. This flame and/or fire retardant thus contains no ammonium nitrate, no halogenated fractions and no melamine compounds and in preferred embodiments omitted urea. A flame and/or fire retardant composed in this sense meets all requirements including a simple and very cost-effective manufacturability and for wood and cellulose, especially for wood and/or cellulose fibers as such, is already particularly well effective as a flame and/or fire retardant.

Surprisingly, it has further been found, according to the invention, that the undesirable afterglow of products consisting of or comprising wood and/or cellulose fibers can be effectively prevented in practice, provided that in addition to the agent from German patent application DE 10 2015 119 558.5 from Nov. 12, 2015 expandable graphite becomes to be used.

Expandable graphite is therefore used according to the invention also in combination with the agent described below according to DE 10 2015 119 558.5.

The invention for reducing the flammability and/or combustibility of materials consists of a mixture of boric acid ($H_3BO_3$), borax ($Na_2B_4O_7*10H_2O$), at least one alkali metal chloride, preferably sodium chloride; and, if desired, urea ($CO(NH_2)_2$) as an optional constituent. However, agents according to the invention preferably contain no urea or this only in comparatively small amounts; i.e. then, for example, preferably in an amount of only 0 to 1.0 parts by weight, in the agent according to the invention defined below.

Thus, the invention relates to the use of expandable graphite in combination with an agent for reducing the flammability and/or combustibility of materials, in particular to flame retarding agents and/or fire retarding agents, according to DE 10 2015 119 558.5, hence a further agent for reducing the flammability and/or combustibility comprising or consisting of a combination and/or a mixture of
  a) 30 to 70 wt.-% boric acid;
  b) 30 to 70 wt.-% borax;
  c) an alkali chloride, preferably sodium chloride, in an amount of less than 5 wt.-%; and
  d) optionally urea up to 5 wt.-%;
in each case based on the combination and/or the mixture as 100 wt.-%.

The invention further relates to an agent for reducing the flammability and/or combustibility of materials, in particular flame retardants and/or fire retardants, comprising or consisting of a combination of expandable graphite with a further inorganic flame retardant and/or fire retardant containing or consisting of a combination and/or a mixture Bs/Bx/S of
  a) from 30 to 70 wt.-% of boric acid;
  b) from 30 to 70 wt.-% borax;
  c) an alkali chloride, preferably sodium chloride, in an amount of less than 5 wt. %; and
  d) if desired, urea up to 5 wt.-%;
in each case based on the combination and/or the mixture as 100 wt.-%. The abbreviation "Bs/Bx/S" stands here and hereinafter for "boric acid/borax/salt" for the obligatory components a), b) and c) of the composition according to DE 10 2015 119 558.5.

According to the invention, the proportion of the combination and/or of the mixture "Bs/Bx/S" (as dry weight) in the above-described materials and/or (pre-)products or uses or processes, if present if desired, preferably not more than 15 wt.-%, preferably not more than 10 wt.-%, more preferably not more than 5 wt.-%, and most preferably not more than 3 wt.-%, each based on the total material and/or (pre-) product as 100 wt.-%.

According to the invention, the proportion of the combination and/or the mixture "Bs/Bx/S" in the above-described materials and/or (pre-)products or uses or processes, if present if desired, is at least 0.5 wt.-%, preferably at least 1 wt.-%, more preferably at least 1.5 wt.-%, even more preferably at least 2 wt.-%, and most preferably at least 3 wt.-%, each based on the total material and/or (pre-)product as 100% by weight.

According to the invention, the proportion of the combination and/or the mixture "Bs/Bx/S", if present if desired, in the materials described above and/or (pre-)products or uses or methods thus in the range of 0.5 wt.-% to 15 wt.-%, from 1 wt.-% to 15 wt.-%, of 1.5 wt.-% to 15 wt.-%, from 2 wt.-% to 15 wt.-%, and from 3 wt.-% to 15 wt.-%. Preferably, the proportion of the combination and/or the mixture "Bs/Bx/S", if present if desired, in this case in the range of 0.5 wt.-% to 10 wt.-%, from 1 wt.-% to 10 wt.-%, from 1.5 wt.-% to 10 wt.-%, from 2 wt.-% to 10 wt.-%, and from 3 wt.-% to 10 wt.-%. More preferably, the proportion of the combination and/or the mixture "Bs/Bx/S", if present if desired, in this case in the range of 0.5 wt.-% to 5 wt.-%, from 1 wt.-% to 5 wt.-%, from 1.5 wt.-% to 5 wt.-%, from 2 wt.-% to 5 wt.-%, and from 3 wt.-% to 5 wt.-%. Most preferably, the proportion of the combination and/or the mixture "Bs/Bx/S", if present if desired, in this case in the range of 0.5 wt.-% to 3 wt.-%, of 1.5 wt.-% to 3 wt.-%, from 2 wt.-% to 3 wt.-%. All predictive percentages by weight in each case relate to the total material and/or (pre-)product as 100% by weight.

In this case, the combination and/or the mixture "Bs/Bx/S", if present if desired, can take over in addition optionally also the function of a (usually inorganic) filler, such as e.g. talc, kaolin or others, and thus replace this filler proportionately. The skilled person may in this case the respective minimum required amount of the combination and/or the mixture "Bs/Bx/S", if present if desired, to ensure the flame and/or fire protection effect and the maximum amount of the combination and/or the mixture "Bs/Bx/S", if present, to easily maintain the required or desired filler characteristics within the limits given above.

The advantages of the stated composition according to DE 10 2015 119 558.5 can be obtained both in dry or solid form when using the composition according to the invention, as well as when used in dissolved form, for example in an aqueous solvent and in particular in aqueous solution. For the use of the composition it is advisable to dissolve the dry or solid form of the composition in an aqueous solvent in order to apply it to the material to be treated and/or to introduce it into the material to be treated. This achieves the absorption capacity for the agent in the material to be treated. Both use variants of the agents and the preparation methods of these agents are described within the scope of the present invention. It has been shown that a surprisingly simple and yet enormously effective solution could be provided for the still existing enormous need for simple, inexpensive, and environmentally friendly, processable and usable agents for reducing the flammability and/or combustibility of various materials of the above-mentioned combination and/or the mixture with the stated ranges of quantities, in particular as flame retardants and/or fire retardants.

The above dry or solid agent of the present invention can be used in any solid form, e.g. depending on the intended use, as individual components for the individual mixing in the stated amounts or also premixed. According to the invention usual dry and solid forms are e.g. powders, granules, pellets, and they can be present in amorphous, crystalline and/or partially crystalline form, optionally in the form of usual hydrates. If desired, the above dry or solid composition according to the invention may be granulated or pelletized. A covering of the dry or solid granulated or pelletized compositions according to the invention for the protection against moisture is not necessary, but in individual cases also not excluded for special applications.

The invention and its advantages can therefore be realized surprisingly also with bulk goods of the components mentioned. The invention therefore also relates to a means for reducing the flammability and/or combustibility of materials, in particular flame retardants and/or fire retardants, comprising or consisting of the above mentioned combination and/or the above mentioned mixture in dry or solid and uncoated form. However, for the purpose of improving the flowability, customary lubricants for powdery or particulate materials may be present in amounts customary per se.

The dry or solid composition according to the invention can be used in any kind of small and large containers, in particular also industrially conventional containers, e.g. barrels, sacks, drums, sacks, drums, big packs, etc., and also stored in the silo or in containers.

The flammability and/or combustibility of the various materials and/or matters to be protected above can be immediately reduced by simply applying an aqueous solution of the composition according to the invention to these materials and/or matters and/or soaking them and/or immersed therein. As materials, let us once again mention the material type, without wishing to limit the above list: wood, paper, textiles, fibers, fabrics. Plastics may also be treated with this agent as a material.

The amount of the starting materials boric acid, borax, alkali chloride, preferably sodium chloride; and possibly urea in said means may vary within the ranges of the invention or the ranges described herein, depending on the material and/or material to be protected from which the flammability and/or combustibility is to be reduced.

The preferred amount in the composition according to the invention, as a combination and/or mixture of boric acid ($H_3BO_3$), according to the invention is 30-70 wt.-%; of borax ($Na_2B_4O_7*10H_2O$) 30-70 wt.-%; and at least one alkali metal chloride, preferably sodium chloride, but present in an amount of less than 5 wt.-%. The alkali metal chloride content is very advantageous for the effect and application according to the invention, but should be less than 5 wt.-% in order to avoid crystallization on prolonged standing of aqueous solutions of the combination and/or of the mixture. The wt.-% data are based on the combination and/or the mixture as 100 wt.-%.

The alkali metal chloride, preferably sodium chloride, is therefore present in the composition according to the invention in an amount of less than 5 wt.-%, preferably in an amount of less than 4.5 wt.-%, in particular in an amount of less than 4 wt.-%, more preferably in an amount of up to 3.5 wt.-%, in particular in an amount of up to 3 wt.-%, even more preferably in an amount of up to 2.5 wt.-%, in particular in an amount of up to 2 wt.-%, and particularly preferably in an amount of up to 1.5 wt.-%, in particular in an amount of up to 1 wt.-%; in each case based on the combination and/or the mixture, as 100 wt.-%. The minimum content of alkali metal chloride, preferably sodium chloride, is in particular 0.1 wt.-%, preferably 0.2 or 0.3 or 0.4 wt.-%, more preferably 0.5 wt.-%; likewise in each case based on the combination and/or the mixture as 100 wt.-%.

In terms of the amounts expressed, the alkali metal chloride, preferably sodium chloride, can be present in the composition according to the invention in an amount of from 0.1 wt.-% to less than 5 wt.-%, preferably 0.2 or 0.3 or 0.4 wt.-% to less than 5 wt.-%, more preferably from 0.5 wt.-% to less than 5 wt.-%, based in each case on the combination and/or the mixture as 100 wt.-%. In the composition according to the invention, the alkali metal chloride, preferably sodium chloride, can also be used in an amount of from 0.1 wt.-% to less than 4.5 wt.-%, preferably 0.2 or 0.3 or 0.4 wt.-% to less than 4.5 wt.-%, more preferably from 0.5 wt.-% to less than 4.5 wt.-%, in particular in each case up to an amount of less than 4 wt.-%, are present; in each case based on the combination and/or the mixture, as 100 wt.-%.

In the composition according to the invention, the alkali metal chloride, preferably sodium chloride, can also be used in an amount of from 0.1 wt.-% to 3.5 wt.-%, preferably from 0.2 or 0.3 or 0.4 wt.-% to 3.5 wt.-%, more preferably from 0.5 wt.-% to 3.5 wt.-%, in particular in each case up to an amount of up to 3 wt.-%; in each case based on the combination and/or the mixture, as 100 wt.-%. In the composition according to the invention, the alkali metal chloride, preferably sodium chloride, can also be used in an amount of from 0.1 wt.-% to 2.5 wt.-%, preferably 0.2 or 0.3 or 0.4 wt.-% up to 2.5 wt.-%, more preferably from 0.5 wt.-% to 2.5 wt.-%, in particular in each case up to an amount of up to 2 wt.-%, in each case based on the combination and/or the mixture, as 100 wt.-%.

The alkali metal chloride, preferably sodium chloride, is preferably present in the composition according to the invention in an amount of from 0.1 wt.-% to 1.5 wt.-%, preferably 0.2 or 0.3 or 0.4 wt.-% up to 1.5 wt.-%, more preferably from 0.5 wt.-% to 1.5 wt.-%, in particular in each case up to an amount of up to 1 wt.-%, in each case based on the combination and/or the mixture, as 100 wt.-%.

The composition according to the invention can either be particularly preferably free of urea ($CO(NH_2)_2$) or, if desired, urea can be used in an amount of up to 5 wt.-% (0 up to 5 wt.-%) to 4 wt.-% (0 to 4 wt.-%), more preferably in an amount up to 3, 2 or 1 wt.-% (0 up to 3, 2 or 1 wt.-%), and wholly particularly preferably in an amount of 0 up to a maximum of 1 wt.-%.

The above agent according to DE 10 2015 119 558.5 is used according to the invention in combination with expandable graphite.

Expanded graphite, also called "expandable graphite", is made from the naturally occurring mineral graphite. A graphite flake consists of layers of honeycombed carbon atoms. Within the layers, the atoms are very tightly connected by covalent bonds. Between the layers only weak binding forces prevail, so that molecules can be embedded (intercalated) between the graphite layers. The incorporation of acids, usually sulfuric acid, converts graphite into expandable graphite.

If expanded graphite is heated, the graphite flakes expand, depending on the quality, to a multiple of the original volume of from a temperature of approx. 140° C. By evaporating the embedded compounds, the graphite layers are driven apart like an accordion. The expanded flakes have a "worm-like" appearance and are usually several millimeters long. Physical properties of expanded graphite: carbon content 85-99 wt.-%; expansion rate 30-400 cc/g; particle size 80%<75 μm-80%>500 μm; starting temperature 140 230° C.

For the production of expanded graphite natural graphite flakes are treated in a bath of acid and oxidizing agent. Commonly used oxidants are hydrogen peroxide, potassium permanganate, and chromic acid, the latter of which may involve after-effects. Mostly, concentrated sulfuric acid or nitric acid usually is used as the compound to be embedded, the reaction being carried out at temperatures of 30° C. to 130° C. for up to four hours. After the residence time, the flakes are washed with water and then dried. Starting temperature and expansion rate depend on the fineness of the graphite. One of the main applications of expanded graphite is flame protection. When exposed to heat, expanded graphite expands to form an intumescent layer on the surface of the material. This slows down the expansion of the fire and counteracts the most dangerous consequences of fire for humans, namely the formation of toxic gases and smoke.

However, the application in connection with flame and/or fire retardants, especially in the field of wood fiber and/or cellulose fiber products has not yet been known and is presented here for the first time by the inventor. The amount of expandable graphite to be used within the scope of the present invention will be measured by a person skilled in the art so as effectively to prevent glowing and/or afterglow and to increase the rate of expansion to the desired and/or desired depending on the application or wood fiber and/or cellulose fiber product acceptable level is set.

According to the invention, the expandable graphite can either be used either alone in the manufacture of flame-protected and/or fire-protected products consisting of or comprising wood fiber and/or cellulose fiber materials or it can be used as a mixture together with the above-described flame- and/or fire-retardant according to DE 10 2015 119 558.5, which will be explained below with reference to two exemplary embodiments.

Based on the amount by weight of the wood fibers used, if appropriate, pretreated, as 100% by weight, the amount of expandable graphite can be varied in a wide range of amounts, e.g. up to 60 wt.-% expandable graphite based on the amount by weight of the wood fibers used as 100 wt.-%; the minimum amount of expandable graphite may amount to e.g. 0.1 wt.-%, 0.5 wt.-%, 1 wt.-%, 2 wt.-%, 3 wt.-%, 4 wt.-%, 5 wt.-%, 10 wt.-%, 15 wt.-%, 20 wt.-% or more, in each case based on the amount by weight of the wood fibers used as 100 wt.-%; intermediate values of said minimum amounts in wt.-% are also possible, e.g. in 0.1 wt.-% increments, 0.5 wt.-% increments and/or 1 wt.-% increments. Likewise, the upper amount of expandable graphite may e.g. 55 wt.-%, 50 wt.-%, 45 wt.-%, 40 wt.-%, 35 wt.-%, 30 wt.-%, or less, be, in each case based on the amount by weight of the wood fibers used as 100 wt.-%; intermediate values of said upper amounts in wt.-% are also possible, e.g. in 0.1 wt.-% increments, 0.5 wt.-% increments and/or 1 wt.-% increments.

In particular, the amount of expandable graphite in the range of 0.1 wt.-% to 60 wt.-%, preferably 1 wt.-% to 60 wt.-%, particularly preferably 5 wt.-% to 60 wt.-%, more preferably from 10 wt.-% to 60 wt.-%, even more preferably from 15 wt.-% to 60 wt.-%, and most preferably from 20 wt.-% to 60 wt.-%, based in each case on weight of the wood fibers used as 100 wt.-%. Intermediate values of said ranges of minimum amount and upper amount in wt.-% are also possible, e.g. in 0.1 wt.-% increments, 0.5 wt.-% increments and/or 1 wt.-% increments, each independently of the minimum amount and upper amount.

Polymeric diphenylmethane diisocyanate (PMDI) is used as binder for the fibers. Polymeric diphenylmethane diisocyanate (PMDI) also called technical MDI, is a mixture of methylene diphenyl isocyanates and homologous aromatic polyisocyanates. The term "polymeric diphenylmethane diisocyanate" is untruly, it is not a polymer, but the mixture contains compounds with several (typically up to 6) phenylene groups, each carrying an isocyanate group. Common trade name is also polymethylene polyphenyl isocyanate. PMDI is used as a binder in wood-based panels, especially in OSB panels and is a starting material for the production of polyurethanes. The technical preparation is carried out by phosgenation of 4,4'-diaminodiphenylmethane (an MDA) and its homologs. This mixture itself is again produced by condensation of aniline with formaldehyde. The composition and properties of the PMDI with regard to reactivity and thus its applicability as a binder are influenced essentially by the following factors: proportions of the MDI isomers (4,4'-MDI, 2,4'-MDI, 2,2'-MDI); molecular weight distribution. PMDI is a brown, very difficultly flammable liquid (flashpoint above 200° C.) that has a higher density than water. The melting point is about −24° C. At 20° C., the density is about 1.23 $g·cm^{-3}$. With regard to wood-based chipboard materials with PMDI, PMDI has some advantages compared to other adhesives used in the wood-based panel industry, which justify the higher price, especially for applications that place greater demands on moisture resistance or formaldehyde emission: resistance to hydrolysis; free of formaldehyde; lower binder necessity.

In an exemplary embodiment, wood fibers (with residual moisture) were introduced into a concrete mixer and mixed therein with added expandable graphite (a wide range of 1 wt.-%-60 wt.-% addition of expandable graphite is possible). Then, a PMDI solution was sprayed on, the mix was poured into a mold and pressed with 170 tons at 200° C. to a plate. The wood fiber product thus produced has sufficient strength and shows after 10 min. flame impingement no burning, no afterglow. The temperature of the fire area dropped abruptly. Expanded graphite has an intimate effect and blooms at the point of fire, prevents the ignition of cellulose or wood fibers, does not permit any temperature increase inside the fiberboard, extinguishes immediately after removal of the flame, and in no way glows. Thus, a classification in the fire protection group B1 would not be a problem, if necessary, it could also be sufficient for A1, if expandable graphite does not escape excessively in the form of ash during puffing and thus the product does not significantly loose of total weight.

In an exemplary embodiment, wood fibers were first placed in boric acid/borax/salt solution or completely soaked and then dried again. Then, the treated wood fibers were filled as in the previous embodiment in a concrete mixer and also sprayed with PMDI, then filled into a mold and pressed with 170 tons at 200° C. to plates. The strength of the fiberboard was also very good, it does not burn, the burning surface radiates some temperature, the afterglow is very low and after 20 min. no afterglow could be observed, the temperature decreased rapidly, and any smoldering points were completely extinguished.

The advantageous effects of the invention in connection with expanded graphite are exemplified in more detail in Example 9 of this application.

In addition to the sole use of expanded graphite, the present invention therefore also provides a surprisingly simple combination and/or simple mixture of expanded graphite together with the composition according to DE 10 201 5 119 558.5 for reducing the flammability and/or combustibility of products from wood and/or cellulose fiber materials, in particular a flame retardant and/or fire retardant, which, in contrast to the material-specific agents of the prior art, surprisingly makes possible a significantly broader application spectrum. For example, it is thus only suitable for a minimal application effort for the respective application area and for a wide range of applications. The flame retardant and/or fire retardant according to the invention can thus be used as described above for protecting cellulosic and/or lignin-containing fibrous materials, for example wood fibers, fibrous wood-containing and/or woody materials, and wood fiber products, and corresponding applications Cellulosic and/or lignin-containing, fibrous materials and products manufactured therewith are used.

The invention thus also relates to the materials treated with the above-described means, in particular flame and/or fire retardants, such as, in particular, cellulose- and/or lignin-containing materials, for example wood, wood-containing and/or woody materials, and wood products (e.g. doors, windows, parquet, laminate, paneling, ceilings; crates, wooden shelves, furniture; wooden construction material such as rafters, laths, wood fiber fillers for cut-outs or voids, wood fiber product applications for roof trusses or ceiling rests, etc.; for example, wooden parts and/or walls of heat cabins and saunas made from woodand/or cellulose-fibers, products made from wood- and/or cellulose-fibers, also in connection with textiles and textile products; with paper and paper products, cardboard, cartons, cardboard packaging; products consisting of or comprising fibers and fabrics, artificial and natural fibers, as well as fabrics therewith; composite products of wood and/or cellulose fibers and plastics and plastic products; insulating materials made of wood and/or cellulose fibers and insulating products and/or composite products therewith, including thermal insulation materials and insulation products, electrical and/or cable insulation and such for all types of electrical installations; paints and paint products, etc.; including composites and/or composite materials and/or basic and/or building materials with the above-mentioned materials and/or matters The invention also relates to products and/or composite materials and/or composite materials comprising the above materials or materials, the preparation of the composition and methods or processes using the composition and/or the corresponding combination of its individual constituents or as a final pre-mixing in the specified ranges for reducing the flammability and/or combustibility.

The present invention also relates to the use of one of the above-defined and described agents for reducing the flammability and/or combustibility of materials, in particular the use as flame retardants and/or fire retardants, for a wide range of applications involving materials with accouterments by a flame retardant and/or fire retardants, e.g. in accordance with statutory requirements, or in which the equipment is desirable by a flame retardant and/or fire retardant for increasing safety, particularly but not by way of limitation, for, in particular, fibrous materials made of wood and/or cellulose and products consisting thereof or comprising these, for which reference is made to the above list of materials and/or the mentioned application areas.

The novel agent according to the invention can be applied and/or sprayed in the surface region of the materials or matters to be protected, depending on the nature of the materials or matters, and/or the materials or matters can be mixed with the inventive agent in the form of an aqueous and/or alcoholic solution dipped and/or impregnated. The materials to be treated can therefore be equipped in a very flexible manner with regard to various respective applications of the materials, both during their manufacture and after their manufacture. It is thus possible, depending on the marketing and application purpose of the respective material, to decide whether the material is produced without treatment and only then, if desired, or already in its production, be accoutered with the agent according to the invention in a freely selectable amount. The person skilled in the art knows the respective methods or methods suitable for the material and/or matter to be protected in order to apply and/or to introduce a substance into the respective material and/or matter and/or for this agent to be removed from the respective material and/or matter.

According to the preferred features, this flame retardant and/or fire retardant can be provided as granules or else in the form of an aqueous solution.

Thus, the invention also relates to an agent of the type described above, which is characterized in that it is present in solid form, preferably as a pellet or granulate.

Furthermore, the invention relates to a composition of the type described above, which is characterized in that it is dissolved in an aqueous solvent, preferably in water.

In a particularly advantageous embodiment, the agent according to the invention of the type described above is characterized in that 50 to 200 g, preferably 75 to 125 g, of the solid combination and/or the solid mixture (solid mixture) solvent, preferably water, relative to 1000 g of total solution.

For use, therefore, a solution is prepared of the above-described type of solid combination and/or solid mixture (solid combination or blend) of component A of the agent containing the defined amount of the flame- and/or flame-protecting solid dissolved in 1 l of the aqueous solvent, preferably water.

If appropriate, the respective release process is supported by heating. Thus, e.g. the mixing together of the constituents is expediently while heating to a temperature of up to about 60° C. A boiling or boiling of the solvent is considered to be inappropriate (energy expenditure and solvent loss). Suitable agitators can support the dissolving process in a manner known per se. The finished solution of the agent according to the invention is applied to the material or the matter, e.g. by casting, spraying or brushing, or impregnated, dipped or mixed with the finished solution, or introduced into the latter during the production of the material.

In the application, the agent according to the invention is allowed to act and/or draw in a time which is customary for the respective material, and can then be applied to the flame retardant and/or flame retardant material or product (product, composite material, composite basic material, insulating material, building material, etc.).

The compositions according to the invention are distinguished from the compositions known in the art by surprising improvements and effects. The person skilled in the art could not take from the prior art the advantageous effect of the constituent alkali metal chloride, particularly preferably sodium chloride, and there were also no indications from which it would have been stimulated to add alkali metal chloride, particularly sodium chloride. This applies in particular to the compositions according to the invention which are free of urea or to those agents according to the invention which contain comparatively little urea and also no other plasticizers. In addition, it has also been found for these alkali metal halides, particularly preferably sodium chloride, that the amounts and ratios described herein are advantageously acting compositions according to the invention, e.g. also by being able to be combined in a variety of ways with the described materials to be treated.

As already mentioned variously herein, the invention has a number of advantages compared to the prior art, some of which are intended to be further representative and exemplary. The ingredients and composition of the invention have no environmental impact. Smoke and exhaust fumes generated by the combustion of the invention are not polluting the environment. Materials and materials which are wetted by the invention or are impregnated in the invention are neither affected by premature deterioration, nor of quality degradation, i.e., the invention has no effect on the original properties of the material and/or matters to be protected.

A further advantage is that the components of the invention are easy and inexpensive to obtain and the production of the flame retardant and/or fire retardant is simple and high production rates are achieved.

With minor modifications of the formula of the composition of the invention, it is possible to achieve a reduction in the flammability and/or combustibility of other industrial products such as wood, paper and other pulps.

The flammability and/or combustibility of matters, textiles, fibers and fabrics can be immediately reduced in a simple way by impregnating them in an aqueous solution according to the invention.

The composition of the invention leaves no undesirable traces on the treated materials and/or matters.

It is also possible to prepare an aqueous solution having the composition of the invention in the form of a spray with which a temporary non-flammable effect can be achieved, which can be wiped off again as desired.

The quality of a treated material and/or matter remains unchanged and is not adversely affected.

A further advantage of the invention is that it can be used in a wide range of industrial branches and products and, if desired, a temporary or even a permanent effect can be achieved. The non-flammable effect of treated fabrics disappears completely by washing, but the effect is retained during dry cleaning.

Further advantages and advantageous embodiments of the invention can be gathered from the following examples and from the claims. All the features described in the description, the following examples and the claims may be essential to the invention, both individually and in any combination with one another.

EXAMPLES

In the following, the functionality of the invention will now be described in more detail by means of examples, but without intending to limit the scope of the invention as a result. The scope of the invention is defined in the patent claims and is supported by the above detailed description. The examples serve for further illustration.

To facilitate the mixing of the compositions in the examples below, it is recommended to heat the water to about 60° C.

Example 1: Flame Retarding Agent

Composition in dry form (powder) for aqueous solvent, in particular for water, to 1000 g total solution; with sum of borax and boric acid to 95 g:

| | |
|---|---|
| Borax | 30 to 65-70 g |
| Boric acid | 30 to 65-70 g |
| Sodium chloride (NaCl) | up to less than 5 g (max. <5 wt.-%) |
| Urea | 0 to 5 g |

Example 2: Flame Retarding Agent

Composition in dry form (powder) for aqueous solvent, in particular for water, to 1000 g total solution; with the sum of borax and boric acid to 100 g:

| | |
|---|---|
| Borax | 35 to 55 g |
| Boric acid | 35 bis 55 g |
| Sodium chloride (NaCl) | up to less than 5 g. |

Example 3: Flame Retarding Agent

Composition in dry form (powder) for aqueous solvent, in particular for water, to 1000 g total solution; with the sum of borax and boric acid to 100 g.

| | |
|---|---|
| Borax | 35 to 55 g |
| Boric acid | 35 to 55 g |
| Sodium chloride (NaCl) | 5 g (4.76 wt. %) |

Example 4: Flame Retarding Agent

Composition in dry form (powder) for aqueous solvent, in particular for water, to 1000 g total solution; with the sum of borax and boric acid to 100 g.

| Borax | 45 to 55 g |
|---|---|
| Boric acid | 45 to 55 g |
| Sodium chloride (NaCl) | up less to than 5 g (4.76 wt.-%) |

Example 5: Flame Retarding Agent

Composition in dry form (powder) for aqueous solvent, in particular for water, to 1000 g total solution; with sum of borax and boric acid to max. 95 g:

| Borax | 45 to 55 g |
|---|---|
| Boric acid | 45 to 55 g |
| Sodium chloride (NaCl) | up less to than 5 g (max. <5 wt.-%) |

Example 6: Flame Retarding Agent

Composition in dry form (powder) for aqueous solvent, in particular for water, to 1000 g total solution; with the sum of borax and boric acid to 100 g:

| Borax | 30 to 70 g |
|---|---|
| Boric acid | 30 to 70 g |
| Sodium chloride (NaCl) | up to 3 g (max. <2.91 wt.-%) |

Example 7 Other Flame Retarding Agents Analogously to Example 6

| Ex. No. | Borax (g) | Boric Acid (g) | NaCl (g) | NaCl (wt.-%) |
|---|---|---|---|---|
| 7a | 60 | 40 | 4 | 3.85 |
| 7b | 40 | 60 | 4 | 3.85 |
| 7c | 60 | 40 | 3 | 2.91 |
| 7d | 40 | 60 | 3 | 2.91 |
| 7e | 60 | 40 | 2 | 1.96 |
| 7f | 40 | 60 | 2 | 1.96 |
| 7g | 54 | 44 | 2 | 2.0 |
| 7h | 54.5 | 44 | 1.5 | 1.5 |
| 7i | 55 | 45 | 1 | 0.99 |
| 7j | 45 | 55 | 1 | 0.99 |
| 7k | 55 | 44 | 1 | 1.0 |
|  | 44 | 55 | 1 | 1.0 |
| 7l | 55 | 44.5 | 0.5 | 0.5 |
| 7m | 54.5 | 45 | 0.5 | 0.5 |
| 7n | 55 | 44.9 | 0.1 | 0.1 |

Example 8: Flame Retarding Agent-Application

The flame retarding agents of Examples 1 to 7 show excellent flame and fire protection properties, in particular in the case of wood-like or paper-like materials, in the test with a gas burner (flame heat, optionally adjustable, between 350 and about 1000° C.). Flame formation is prevented by the agent and, if an initial slight flame formation occurs during the action of the gas burner, the flame extinguishes very quickly and cannot maintain itself.

Example 9: Flame Retardant Applications Expanded Graphite—Wood Fiber Insulation Panel Tests

Example 9a

In a first experiment, wood fibers were filled in a concrete mixer and sprayed initially with the flame protection (boric acid/borax/salt) and then sprayed with a PMDI binder (formaldehyde-free binder with very little use, so far urea in the prior art). After sufficient mixing, the treated wood fibers were pressed under high pressure and temperature to form wood fiber insulation boards. The cellulose/wood fiber panels produced did not burn off very quickly, despite the fact that they were ignited for 10 minutes, but only very slowly by internal afterglow, which was caused by the stored internal ignition temperature and the oxygen present. This phenomenon is the main problem, which is why such a wood fiber insulation board of the prior art does not achieve a fire certificate (B1).

Example 9b

In a further experiment, the PMDI was mixed with two different fire retardants. Since the PMDI reacts with water and contained water in both of the fire retardants used, these tests were not successful either. From the experiments, the hypothesis was found that boric acid from the fire retardants protects the wood fibers well and thus there was after-glow of the PMDI. Therefore, additional phosphonate-based fire retardants were applied, but this was also not successful.

Example 9c

Further tests with different mix variants of fire retardants were intensified and experiments were carried out in a similar manner to the above failed attempts: wood fibers were mixed in the concrete mixer with 20 wt.-% of boric acid flame retardant and 5 wt.-% of phosphonate-based flame retardant and 0.3 wt.-% PMDI, mixed and pressed under pressure and temperature to give wood fiber boards. The wood fibers were, however, too wet, so they could hardly be glued together, but they still glowed in a fire/flame test, even after complete drying.

Example 9d

The above failed attempts were modified to experiments according to the invention. Two representative experiments were carried out:
Inventive Experiment 1:
500 g of wood fibers were charged into a concrete mixer with 12% residual moisture, then 120 g of expanded graphite (possible also with less and more, in particular in the range 1 wt.-%-60 wt.-%, based on the weight of the wood fibers 100 wt.-%) and the mixture is mixed for 5 minutes. 0.3 wt.-% of PMDI (based on treated wood fibers as 100 wt.-%) were then sprayed. The mixture was introduced into a mold and pressed at 170 tons at 200° C. The obtained wood fiber board product exhibited the practical strength required. After 10 minutes of flaming, no firing and no after-glow was observed, the temperature of the fire area fell abruptly. Expanded graphite had an intumescent effect, inflated at the burn site, prevented the ignition of the cellulose, left no temperature in the wood, extinguished immediately after the flame had been removed, and did not glow after. Thus, the wood fiber board product protected with expanded graphite had fire protection properties for at least a B1 certificate.

Inventive Experiment 2:

Wood fibers in boric acid/borax/salt solution were introduced or completely impregnated in an amount as described in the general part of the application. These treated wood fibers were allowed to dry again, they were introduced into a concrete mixer and sprayed with 0.3 wt.-% of PMDI (based on treated wood fibers as 100 wt.-%), then introduced into a press mold, and 170 tons at 200° C. The strength of the wood fiber board obtained was also very good, it did not burn with flaming, the fire surface still emitted some temperature after exposure, but the afterglow was very minor and no afterglow was observed after 20 minutes at the latest, the embers which have been observed when flamed are completely extinguished.

Example 10

In insulation, wall coverings and floor coverings, for example in the form of foam, press, felt, nonwoven and/or composite (pre-)products consisting of or comprising wood and/or cellulose fibers and binders and/or glues and/or polyolefin-based materials of the type described above, the use of expanded graphite has proved to be very advantageous.

The invention can therefore be applied to the embodiments relating to materials and/or (pre-)products which consist of or comprise wood fibers and/or cellulose fibers containing in particular binders and/or glues and/or wood powders and/or cellulose powders and/or wood granules and/or cellulose granules, and/or consisting of or comprising polyolefin-based materials of the type described above, by incorporating expandable graphite, in particular as a flame retardant and/or fire retardant, directly into these materials and/or (pre-)products to reduce the flammability and/or combustibility. For example, a composition possibly containing fillers (e.g. talc, kaolin) and optionally additionally a combination and/or a mixture Bs/Bx/S, containing expandable graphite can be scattered onto a treated or untreated foam, press, felt, fleece and/or composite (pre-)product (or carrier formed therefrom) as a powder and/or granules and/or, if present as a solution or emulsion or suspension, can also be sprayed onto, the coating thus obtained melted onto, possibly also under surface pressure or surface pressing, and/or dried, for example, at temperatures of e.g. about >200° C. For the application onto also extrusion processes can be used.

The use of expanded graphite in the described materials and/or (pre-)products makes it possible, to effectively prevent in the case of (vertical) edge-flaming, a fusing or dropping by fusing of the e.g. binder and/or glue contained in the wood fibers and/or cellulose fibers and/or from wood powders and/or cellulose powders and/or wood granules and/or cellulose granules, and especially of polyolefin-based materials contained in the materials and/or (pre-)products such as in particular polyethylene, polypropylene and/or polystyrene, and thus prevent the formation of flame and the spread of a fire, but at least to impede it over a sufficient period of time.

The invention claimed is:

1. A method of using expandable graphite for reducing flammability or combustibility of expandable graphite-containing materials or products, wherein the expandable graphite is present in an amount of up to 45% by weight of the total expandable graphite-containing materials or products, and wherein the expandable graphite is combined with a mixture for reducing the flammability or combustibility of materials or products, wherein the mixture is present in an amount of up to 15% by weight of the total expandable graphite-containing materials or products and comprises:
   a) 30 to 70% boric acid by weight of the mixture;
   b) 30 to 70% borax by weight of the mixture;
   c) an alkali metal chloride is present in an amount of less than 5% by weight of the mixture; and
   d) the composition is free of urea.

2. The method of claim 1, wherein the expandable graphite-containing materials or products comprise wood fibers, cellulose fibers, wood powders, cellulose powders, wood granules, cellulose granules, polyolefin-based materials, binders, glues, containing materials, insulation material, floor coverings, wall coverings, or a combination thereof.

3. The method of claim 1, wherein the alkali metal chloride is sodium chloride.

4. Expandable graphite-containing materials, products or precursors comprising:
   wood fibers, cellulose fibers, wood powders, cellulose powders, wood granules, cellulose granules, polyolefin-based materials, binders, glues, insulation materials, floor coverings, or wall coverings, or a combination thereof, wherein expandable graphite is incorporated into the expandable graphite-containing materials, products, or precursors for reducing flammability or combustibility, and wherein expandable graphite is present in an amount of not more than 45% by weight of the total expandable graphite-containing materials or products and is incorporated in combination with a mixture present in an amount of 15% by weight of the total expandable graphite-containing materials or products, the mixture reduces the flammability or combustibility of materials and comprises:
   a) 30 to 70% boric acid by weight of the mixture;
   b) 30 to 70% borax by weight of the mixture;
   c) an alkali metal chloride is present in an amount of less than 5% by weight of the mixture; and
   d) urea in an amount of up to 5% by weight of the mixture.

5. The expandable graphite-containing materials, products or precursors of claim 4, wherein the an alkali metal chloride is sodium chloride.

6. The expandable graphite-containing materials, products or precursors of claim 4, wherein the minimum content of alkali metal chloride is 0.1%, by weight of the mixture.

7. The expandable graphite-containing materials, products or precursors of claim 4, wherein the minimum content of alkali metal chloride is 0.2% by weight of the mixture.

8. The expandable graphite-containing materials, products or precursors of claim 4, wherein the minimum content of alkali metal chloride is 0.4% by weight of the mixture.

9. The expandable graphite-containing materials, products or precursors of claim 4, wherein the minimum content of alkali metal chloride is 0.5% by weight of the mixture.

10. The expandable graphite-containing materials, products or precursors of claim 4, wherein the alkali metal chloride is present in an amount of less than 4.5% by weight of the mixture.

11. The expandable graphite-containing materials, products or precursors of claim 4, wherein the alkali metal chloride is present in an amount of less than 3% by weight of the mixture.

12. The expandable graphite-containing materials, products or precursors of claim 4, wherein the alkali metal chloride is present in an amount of up to 2.5% by weight of the mixture.

13. The method of claim 1, wherein the minimum content of alkali metal chloride is 0.1%, by weight of the mixture.

14. The method of claim 1, wherein the minimum content of alkali metal chloride is 0.2% by weight of the mixture.

15. The method of claim 1, wherein the minimum content of alkali metal chloride is 0.4% by weight of the mixture.

16. The method of claim 1, wherein the minimum content of alkali metal chloride is 0.5% by weight of the mixture.

17. The method of claim 1, wherein the alkali metal chloride is present in an amount of less than 4.5% by weight of the mixture.

18. The method of claim 1, wherein the alkali metal chloride is present in an amount of less than 3% by weight of the mixture.

19. The method of claim 1, wherein the alkali metal chloride is present in an amount of up to 2.5% by weight of the mixture.

\* \* \* \* \*